United States Patent [19]

Nozaki

[11] Patent Number: 4,947,188

[45] Date of Patent: Aug. 7, 1990

[54] THERMAL HEAD AND THERMAL RECORDING APPARATUS USING THE SAME

[75] Inventor: Mineo Nozaki, Kawasaki, Japan

[73] Assignee: Canon Kabushiki Kaisha, Tokyo, Japan

[21] Appl. No.: 436,138

[22] Filed: Nov. 14, 1989

Related U.S. Application Data

[63] Continuation of Ser. No. 184,887, Apr. 21, 1988, abandoned.

[30] Foreign Application Priority Data

| | | | |
|---|---|---|---|
| Apr. 27, 1987 | [JP] | Japan | 62-101879 |
| Apr. 27, 1987 | [JP] | Japan | 62-101880 |
| Apr. 28, 1987 | [JP] | Japan | 62-103004 |
| Apr. 28, 1987 | [JP] | Japan | 62-103005 |

[51] Int. Cl.[5] ........ G01D 15/10

[52] U.S. Cl. ........ 346/76 PH; 400/120

[58] Field of Search ........ 346/76 PH; 400/120

[56] References Cited

U.S. PATENT DOCUMENTS

| | | | |
|---|---|---|---|
| 4,384,797 | 5/1983 | Anderson et al. | 400/696 |
| 4,516,137 | 5/1985 | Yasui | 346/76 PH |
| 4,539,571 | 9/1985 | Suzuki | 346/76 PH |
| 4,545,693 | 10/1985 | Bartlett et al. | 400/120 |
| 4,572,687 | 2/1986 | Croley et al. | 400/696 |
| 4,675,692 | 6/1987 | Goshima et al. | 346/1.1 |
| 4,746,933 | 5/1988 | Asakura | 346/76 PH |

FOREIGN PATENT DOCUMENTS

| | | | |
|---|---|---|---|
| 76892 | 4/1983 | European Pat. Off. | |
| 0112474 | 7/1984 | European Pat. Off. | |
| 0115841 | 8/1984 | European Pat. Off. | |
| 0194528 | 9/1986 | European Pat. Off. | |
| 48-71934 | 9/1973 | Japan | |
| 58-42474 | 3/1983 | Japan | 400/120 |
| 0212971 | 12/1983 | Japan | 346/76 PH |
| 0143975 | 7/1985 | Japan | 400/120 |
| 60-250970 | 12/1985 | Japan | |
| 0257260 | 12/1985 | Japan | 400/120 |
| 61-122664 | 5/1986 | Japan | |
| 0033658 | 2/1987 | Japan | 400/120 |

*Primary Examiner*—George H. Miller, Jr.
*Assistant Examiner*—Huan Tran
*Attorney, Agent, or Firm*—Fitzpatrick, Cella, Harper & Scinto

[57] ABSTRACT

A thermal recording apparatus for recording an image on a recording medium has a thermal head having a first row of heat generating elements and a second row of heat generating elements which is arranged substantially parallel to the first row of heat generating elements of a predetermined interval. A scanner relatively scans the thermal head and the recording medium to perform recording and the recording medium is preheated by the row of heat generating elements which reaches an image recording position first.

28 Claims, 9 Drawing Sheets

THERMAL HEAD AND THERMAL RECORDING APPARATUS USING THE SAME

This application is a continuation of application Ser. No. 184,887 filed April 21, 1988, now abandoned.

BACKGROUND OF THE INVENTION:

1. Field of the Invention

The present invention relates to a thermal head for recording an image on a recording medium and a thermal recording apparatus using the thermal head.

For example, the present invention relates to a thermal head for recording an image on normal or thermal paper by a thermal transfer method or a normal thermal recording method, and a thermal recording apparatus using the thermal head.

2. Related Background Art

As recording apparatuses such as a printer, a facsimile, a typewriter, and the like, a serial-type recording apparatus is widely used. In a recording apparatus of this type, a recording head is mounted on a carriage which moves along a platen, and a recording operation is performed while the recording head scans a recording sheet (recording medium). A variety of recording methods such as an ink-jet method, a wire-dot method, a thermal method, and the like have been developed. A thermal recording apparatus includes a thermal transfer recording apparatus in which a normal sheet is employed, and a recording head (thermal head) is urged against the sheet through an ink ribbon to transfer a melted ink, and a thermal recording apparatus in which a thermal sheet (which is colored upon heating) is employed and a thermal head is urged against the sheet, so that the sheet is directly heated, thereby performing recording.

An ink ribbon includes a penetration type ribbon with which a thermally melted ink penetrates into a recording sheet, and an adhesion type ribbon for adhering ink onto a recording sheet surface upon melting. An adhesion type ribbon allows correction by lifting off a transferred ink.

Recently, a multilayered, multi-color ink ribbon developed. In a ribbon of this type, different ink layers are subjected to recording depending on a difference in lift-off temperature, so that a plurality of colors can be recorded by a single ribbon.

However, a conventional thermal head has only one recording heating member. Thus, when a penetration type ink ribbon, non-penetration type ink ribbon, a multilayered, multi-color ink ribbon, or the like is used, it is impossible to control a lift-off temperature by a single recording heating member.

For this reason, a recording operation using an ink ribbon and a lift-off operation cannot both be satisfactorily performed unless special control is made, e.g., a lift-off position of an ink ribbon is mechanically changed or a feed speed of an ink ribbon is changed.

SUMMARY OF THE INVENTION

It is an object of the present invention to provide a thermal head capable of recording a clear image on a recording medium, and a thermal recording apparatus using the thermal head.

It is another object of the present invention to provide a thermal head capable of preliminary heating of a recording medium or a thermal transfer medium, and a thermal recording apparatus using the thermal head.

It is still another object of the present invention to provide a thermal head suitable for recording using a penetration type ink ribbon, a non-penetration type ink ribbon, and a multilayered, multi-color ink ribbon, and a thermal recording apparatus using the thermal head.

It is still another object of the present invention to provide a thermal head which comprises a plurality of heat generating elements and can be used with a thermal transfer ink ribbon having ink layers of different lift-off temperatures, and a thermal recording apparatus using the thermal head.

It is still another object of the present invention to provide a thermal head capable of performing a recording operation and a lift-off operation using a thermal transfer medium (e.g., a so-called ink ribbon or ink sheet), and a recording apparatus using the thermal head.

According to one aspect of the invention, a thermal recording apparatus transfers ink of a thermal transfer medium to a recording medium to record an image thereon. The thermal recording apparatus includes a thermal head having a plurality of parallel rows of heat generating elements at predetermined intervals, and scanning means for relatively scanning the thermal head and the recording medium to perform image recording. In addition, setting means selects a type of thermal transfer medium, and drive means selects and drives a row of heat generating elements in correspondence with the selected thermal transfer medium.

According to another aspect of the invention, a thermal recording apparatus transfers ink of a thermal transfer medium to a recording medium to record an image thereon. The recording apparatus includes a thermal head having a first row of heat generating elements and a second row of heat generating elements arranged substantially parallel to the first row of heat generating elements at a predetermined interval. Scanning means relatively scans the thermal head and the recording medium to perform recording, and setting means selects a type of thermal transfer medium to be used. A row of heat generating elements are selected to be used for recording in correspondence with the thermal transfer medium selected by the setting means, and changing means changes a scanning speed of the scanning means in correspondence with the selected thermal transfer medium and the row of heat generating elements to be used.

DETAILED DESCRIPTION OF THE PREFERRED EMBODIMENTS

An embodiment of a thermal head to which the present invention is applied will be described hereinafter.

Preferred embodiments of the present invention will be described with reference to the accompanying drawings.

Figure 1:
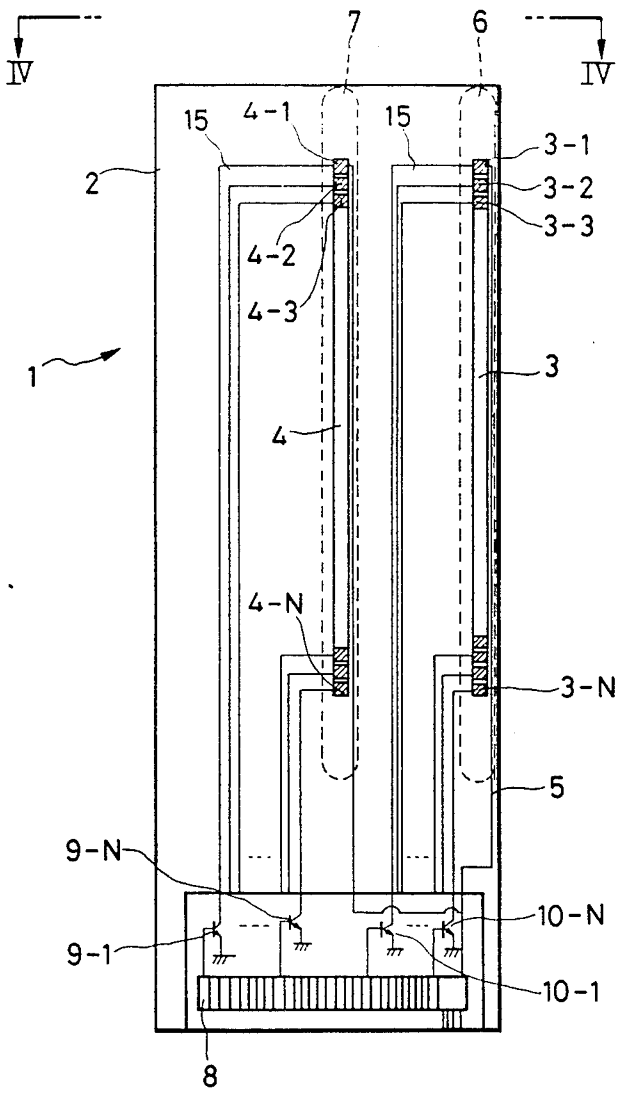
FIG. 1 is a view showing a structure of a thermal head according to an embodiment of the present invention when seen from a recording surface.
Figure 2:
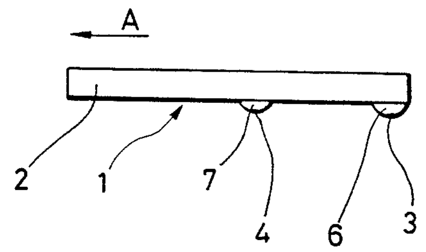
FIG. 2 is a plan view of the thermal head shown in FIG. 1 when seen from a line IV—IV in FIG. 1.
Figure 3:
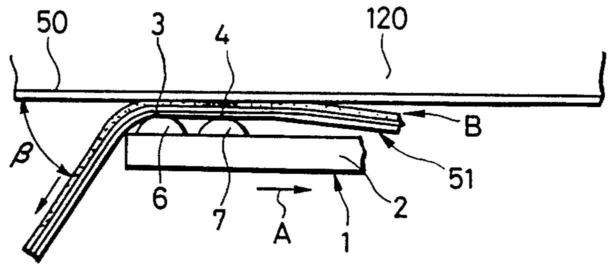
FIG. 3 is a view exemplifying a state of using the thermal head of this embodiment.

Description of Thermal Head (FIGS. 1 to 3)

FIG. 1 is a view showing a structure of a recording surface of a thermal head according to an embodiment.

Referring to FIG. 1, a thermal head 1 is constituted by a dot forming means comprising rows 3 and 4 of heat generating elements for image recording on a surface of a ceramic board 2. The rows 3 and 4 of heat generating elements respectively include heat generating elements 3-1 to 3-N and 4-1 to 4-N, which are connected to a common electrode 5. In this embodiment, the thermal head has a plurality of rows 3 and 4 of heat generating elements which are provided at a predetermined interval in the recording direction to be parallel to each other, and have an identical number of heat generating elements. Energization control of the heat generating elements 3-1 to 3-N and 4-1 to 4-N is performed by the common electrode 5 and individual electrodes 15 connected to the elements 3-1 to 3-N and 4-1 to 4-N. Note that the rows 3 and 4 of heat generating elements are formed on glass glazes 6 and 7. The glass glazes 6 and 7 have substantially the same width and height, but may have different widths and heights. Note that the row 3 of heat generating elements is provided at an upstream end portion in the recording direction of the ceramic board 2.

The total bit capacity of shift registers 8 corresponds to at least 2N bits. The shift registers 8 receive serial image data to be recorded from an external circuit together with a sync clock. The outputs from the shift registers 8 are input to the bases of corresponding NPN transistors 9-1 to 9-N and 10-1 to 10-N. During a recording operation, when a predetermined voltage is applied to the common electrode 5 in synchronism with a recording timing, the NPN transistors which received H-level outputs from the shift registers 8 are turned on. Thus, a current flows from the common electrode 5 to the transistors, thereby energizing and heating the corresponding heat generating elements so as to perform recording.

FIG. 2 is a view of the thermal head when seen from a line IV—IV in FIG. 1. The thermal head 1 moves in a direction indicated by arrow A to perform printing.

FIG. 3 is a view showing a state of using the thermal head 1.

Referring to FIG. 3, the thermal head 1 is arranged to oppose a recording sheet 50 backed up by a platen 120.

During a recording operation, an ink ribbon 51 is fed in a direction of arrow B in synchronism with movement of the thermal head 1, as shown in FIG. 3 and passes by the rows 3 and 4 of heat generating elements. Thereafter, the ink ribbon 51 is lifted off from its rear end at a lift-off angle $\beta$. When a recording operation is performed using only one row of heat generating elements of the thermal head 1, the output data of the other row of heat generating elements are set to be all "0"s so as to perform recording.

Description of Ink Ribbon (FIG. 4)

Figure 4A:
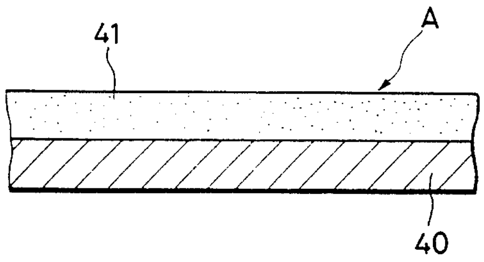
FIGS. 4A to 4C are sectional views showing a structure of an ink ribbon.
Figure 4B:
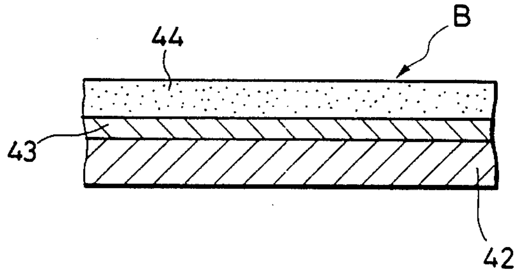
Figure 4C:
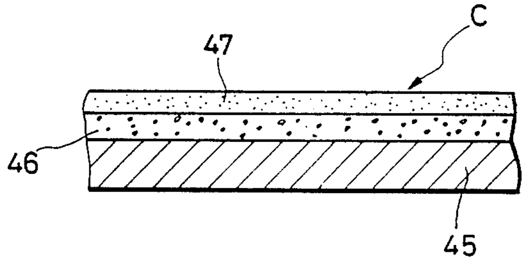

FIGS. 4A to 4C illustrate sectional structures of various types or sorts of thermal transfer ink ribbons.

FIG. 4A shows a sectional structure of a penetration type ink ribbon A.

A base film 40 of polyester or the like has a thickness of about 3.5 μm. An ink layer 41 contains a pigment such as carbon black or a dye as a coloring agent, and an oil as a softening agent, and the like. The ink layer 41 is adhered to the base film 40 by a binder agent containing carnauba wax or ester wax. The thickness of the ink layer 41 is preferably about 4 μm.

In the penetration type ink ribbon A, when ink in the ink layer 41 is melted by heating, it has a low viscosity and can easily penetrate into a recording sheet. Therefore, when the ink ribbon A is lifted off from the recording sheet ,upon printing after, an ink temperature is decreased, the printing quality is good.

FIG. 4B shows a sectional structure of a non-penetration type ink ribbon B which can be lifted off.

In the non-penetration type ink ribbon B, a lift-off layer 43 which is easily melted and has a low viscosity upon heating is formed between a polyester base film 42 and an ink layer 44. The ink layer 44 is adhesion type layer, so that an ink melted by heating has a high viscosity and is not easily penetrated into a recording sheet. For example, the ink layer 44 is formed of a material prepared by mixing carbon black or another dye with a medium such as ethylene-vinyl acetate as a polymetric compound a polyacrylic resin, polyvinyl alcohol resin or the like, which provides an adhesion force upon heating.

The lift-off layer 43 employs a wax material or polyethylene or polyamide of a small molecular weight, which is melted and has a low viscosity upon heating. In FIG. 4B, the thickness of the base film 42 is 3.5 μm, that of the lift-off layer 43 is 2 μm, and the ink layer 44 is about 4 μm.

In the non-penetration type ink ribbon B, ink is lifted off from the base film 42 while the temperatures of the heated lift-off layer 43 and the ink layer 44 are kept high, and is transferred to a recording sheet 2 so as to satisfactorily perform printing. If the ink is peeled from the base layer after the temperatures of the heated layers are decreased, since the adhesion force among the base 42, the lift-off layer 43, and the ink layer 44 is higher than that between the ink layer 44 and the recording sheet, the ink layer 44 is not transferred to the recording sheet but is returned to the base film 42.

FIG. 4C shows a sectional structure of a multilayered, multi-color ink ribbon C.

The ink ribbon C is constituted by a polyester base film 45, a first ink layer 46 containing a coloring pigment or dye such as carbon black, and a second ink layer 47 having a lower adhesion force than that of the first ink layer 46 and containing a different coloring pigment or dye from that of the first ink layer 46. The thickness of the base film 45 can be 3.5 μm, that of the first ink layer 46 can be 3 μm, and that of the second ink layer 47 can be about 3 μm.

In this multilayered, multi-color ink ribbon C, when an ink is heated and lifted off while its temperature is kept high, an adhesion force between the second and first ink layers 47 and 46 is decreased, and only the second ink layer 47 is transferred to the recording sheet. When the heated ink is cooled and lifted off, the adhesion force between the second and first ink layers 47 and 46 which was decreased once is increased again, and the adhesion force between the recording sheet and the second ink layer 47 becomes higher than that between the base film 45 and the first ink layer 46. Therefore, both the second and first ink layers 47 and 46 are transferred to the recording sheet. In this case, since the first ink layer 46 is overlaid on the second ink layer, an image is recorded in the color of the first ink layer 46.

In the variety of ribbons A, B, and C described above, as is well known, a coating agent such as silicone is applied on a surface of the base film opposite to the ink layer in order to prevent thermal and mechanical damage to the base film.

Description of State of using Thermal Head (FIGS. 5 and 6)

FIGS. 5A and 5B and 6A and 6B are views for explaining states of using the thermal head. The same reference numerals in FIGS. 5 and 6 denote the same parts as in FIG. 3.

Figure 5A:
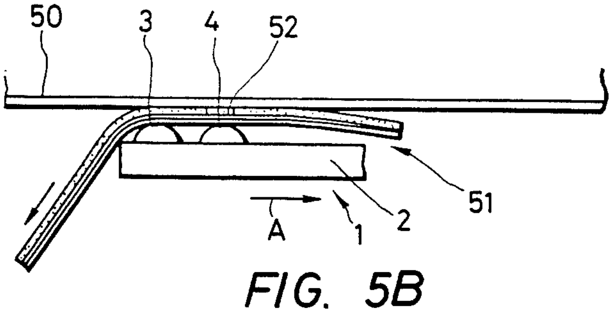
FIGS. 5A and 5B and FIGS. 6A and 6B are views showing a state of using thermal head of this embodiment.
Figure 5B:
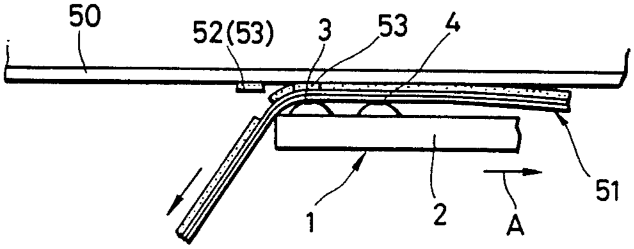

FIG. 5A shows a state wherein an ink ribbon having a low lift-off temperature is used. For example, when a recording operation is performed using the penetration type ink ribbon and the first ink layer 46 of the multilayered, multi-color ink ribbon shown in FIGS. 4A and 4C, the heat generating element 4 is heated. Thus, a portion 52 of an ink ribbon 51 which contacts the heat generating element 4 is heated and melted. As shown in FIG. 5B, along with the movement of the thermal head 1 in the direction of arrow A, the ribbon 51 is lifted off from the recording sheet 50. Since a distance (time) is long enough until the ribbon 51 is lifted off, the ink of the melted portion 52 is transferred to the surface of the recording sheet 50, thus achieving recording.

When an ink ribbon having a high lift-off temperature is used, for example, when a non-penetration type ink ribbon and the second ink layer 47 of the multilayered, multi-color ink ribbon shown in FIGS. 4B and 4C are subjected to recording, the heat generating element 3 is heated in FIG. 5B, and a portion 53 of the ink ribbon 51 which contacts the heat generating element 3 is melted. In this case, since a distance (time) until the ink ribbon 51 is lifted off from the recording sheet 50 is short, the ink ribbon is not cooled, and is lifted off while having a high viscosity. Therefore, as shown in FIG. 5B, the ink of the melted portion 53 is transferred to the surface of the recording sheet 50, thus achieving recording.

Figure 6A:
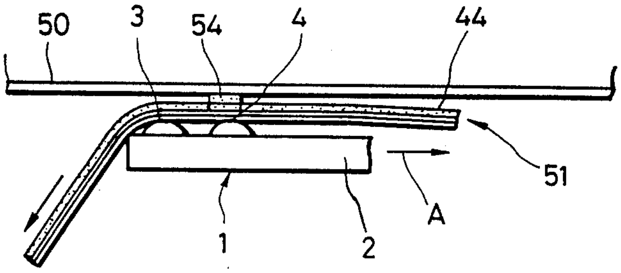
Figure 6B:
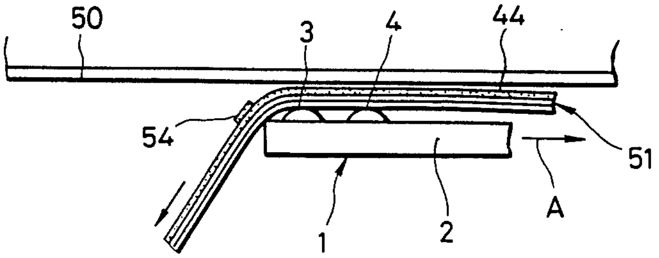

FIGS. 6A and 6B show a case wherein an image recorded on a recording sheet is eliminated by lift-off.

In FIG. 6A, the heat generating element 4 is heated through the non-penetration type ink ribbon shown in FIG. 4B at a position of a dot 54 of the recording sheet 50. The heated dot 54 is bonded to the ink layer 44 of the ink ribbon 51 in a melted state. Thereafter, when the thermal head 1 is moved in the direction of arrow A and a state shown in FIG. 6B is established, the ink layer 44 is cooled, and the interface between the dot 54 and the ink layer 44 is hardened in an adhered state. Thus, when the ink ribbon 52 is lifted off from the recording sheet 50, the dot 54 is lifted off from the recording sheet 50 together with the ribbon 51, thus performing lift-off elimination.

As described above, when the heat generating elements 4 are heated, image recording by a penetration type ink ribbon or lift-off elimination by a non-penetration type ink ribbon can be performed. When the heat generating elements 3 are heated, image recording by the non-penetration type ink ribbon can be performed. In the case of the multilayered, multi-color ink ribbon, recording can be performed in different colors by heating one of first and second heat generating elements.

Figure 7:
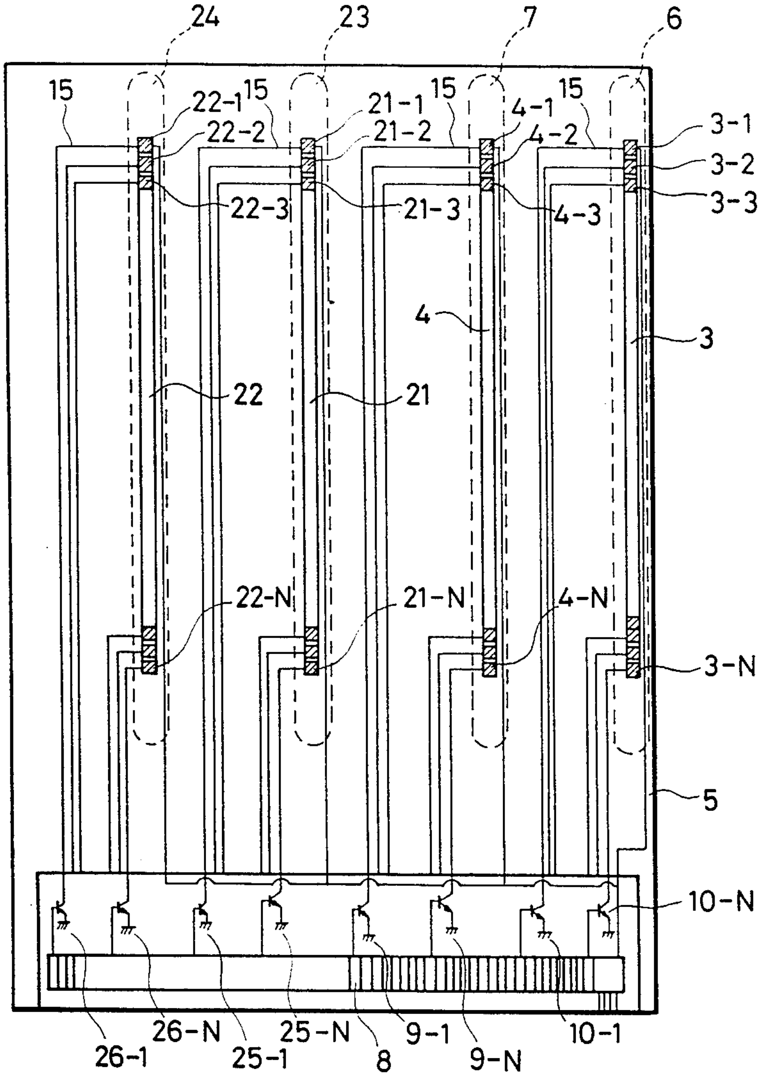
FIG. 7 is a view showing a structure of a thermal head according to another embodiment of the present invention when seen from a recording surface.

FIG. 7 shows a structure of a thermal head according to another embodiment. The thermal head of this embodiment comprises four rows of heat generating elements, so that further fine temperature setting and recording control are allowed. In FIG. 7, rows 21 and 22 of heat generating elements are respectively constituted by N heat generating elements 21-1 to 21-N and 22-1 to 22-N. The outputs from shift registers 8 are input to the bases of corresponding NPN transistors 25-1 to 25-N and 26-1 to 26-N. Note that the rows 21 and 22 of heat generating elements are respectively formed on glass glazes 23 and 24.

According to this embodiment as described above, recording can be performed in correspondence with a variety of ink ribbons.

When image recording is performed by utilizing the heat generating elements 3 of the thermal head 1, the heat generating elements 4 contact a desired recording position earlier. Thus, the ink ribbon 51 is slightly heated by the heat generating elements 4 so that the ink of the ink ribbon 51 is not transferred and recorded on the recording sheet 50. Thus, recording can be performed while saving heating energy of the heat generating elements 3. With this operation, a capacity of an energization power source for the thermal head can be advantageously reduced.

In this embodiment, the dot size of the heat generating elements is substantially constant. However, the dot size may be changed in accordance with ink characteristics of an ink ribbon to be used.

An interval between the rows of heat generating elements may be arbitrarily determined. In consideration of a ribbon loss due to a distance to a portion for lifting off the ink ribbon from the recording sheet, the interval is preferably as small as possible within a range capable of causing a temperature difference of a ribbon upon lift-off.

The rows of heat generating elements are energized by the common electrode 5 simultaneously. However, a common electrode may be provided for each row of heat generating elements, so that the rows of heat generating elements may be driven at different times. A heating temperature of the rows of heat generating elements may be changed, so that preliminary heating may be performed or the thermal head of this embodiment may be applied to a still higher- or lower-temperature ink ribbon.

If the number of heat generating elements of the thermal head is small, the circuit portion such as shift registers may be provided outside a thermal head board.

According to the thermal head of this embodiment as described above, image recording can be performed using a variety of ink ribbons of different lift-off temperatures.

A thermal recording apparatus using the thermal head of the above embodiments will be described with reference to FIGS. 8 to 14.

The thermal recording apparatus of an embodiment described below comprises a thermal head having a first row of heat generating elements and a second row of heat generating elements provided substantially parallel to the first row of heat generating elements at a predetermined interval, a scanning means for relatively scanning the thermal head and a recording medium to perform recording, and a preliminary heating means for preliminarily heating the recording medium or a thermal transfer medium by the first row of heat generating. elements which reaches a recording position earlier.

With the above arrangement, when the recording medium and the thermal head comprising the first row of heat generating elements and the second row of heat generating elements provided substantially parallel to the first row of heat generating elements at a predetermined interval are relatively scanned to perform image recording, the recording medium or the thermal transfer medium is preliminarily heated by the first row of heat generating elements which first reaches a recording position.

In an embodiment to be described below, a thermal recording apparatus for transferring ink from a thermal transfer medium to a recording medium to perform recording, comprises a thermal head comprising at least two rows of heat generating elements which are arranged parallel to each other at a predetermined interval, a scanning means for relatively scanning the thermal head and the recording medium to perform image recording, a setting means for setting the type of the thermal transfer medium, and a drive means for selecting and driving a row of the heat generating elements to be used in accordance with the sort of thermal transfer medium.

With the above arrangement, in this embodiment, when the recording medium and the thermal head comprising at least two rows of heat generating elements which are arranged substantially parallel to each other at a predetermined interval are relatively scanned to perform recording, a row of the heat generating elements is selected and driven in accordance with the thermal transfer medium set, or selected, by the setting means.

Furthermore, in an embodiment to be described below, a thermal recording apparatus for transferring ink from a thermal transfer medium to a recording medium to perform image recording, comprises a thermal head having a first row of heat generating elements and a second row of heat generating elements arranged substantially parallel to the first row of heat generating elements at a predetermined interval, a scanning means for relatively scanning the thermal head and the recording medium to perform recording, a setting means for setting, or selecting the type of thermal transfer medium, means for selecting a row of heat generating elements used for recording in correspondence with the, selected thermal transfer medium, and a changing means for changing a scanning speed of the scanning means in correspondence with the selected thermal transfer medium and the row of heat generating elements to be used.

With the above arrangement, in this embodiment, the thermal head comprising a first row of heat generating elements and a second row of heat generating elements provided substantially parallel to the first row of heat generating elements at a predetermined interval is used, and a row of heat generating elements of the thermal head to be used for recording is selected in correspondence with the selected thermal transfer medium. The scanning speed of the scanning means is changed in correspondence with the selected thermal transfer medium and the row of heat generating elements to be used, so as to achieve a recording operation corresponding to temperature characteristics of the thermal transfer medium.

A preferred embodiment of the present invention will be described hereinafter with reference to the accompanying drawings.

Figure 8:
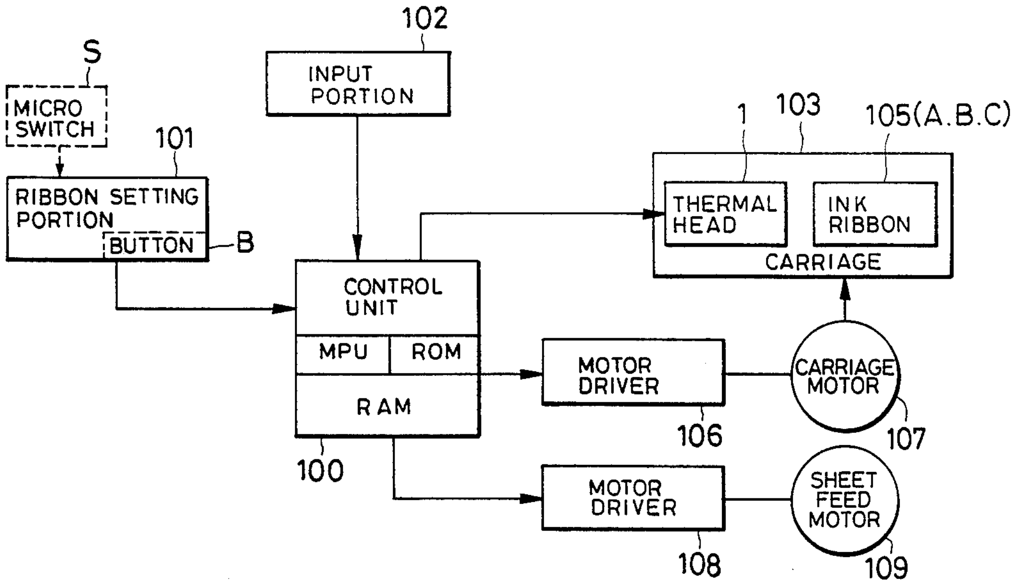
FIG. 8 is a view showing a schematic arrangement of of a thermal transfer printer according to an embodiment of the present invention.

Description of Thermal Transfer Printer (FIG. 8)

FIG. 8 is a view showing a schematic arrangement of a thermal transfer printer comprising a thermal head of the above embodiment. The printer of this embodiment is applied to an output section of a variety of equipment such as a wordprocessor, an electronic typewriter, a facsimile system, and the like.

In FIG. 8, a control unit 100 controls the overall printer, and comprises, e.g., an MPU such as a microprocessor, a ROM for storing a control program for the MPU, and data, and the like, a RAM serving as a working area, and the like. The control unit 100 performs operation control such that it receives print data from an input portion 102 to print it. A ribbon setting portion 101 inputs a type or sort (e.g., A, B, or C described above) of thermal transfer ink ribbon 105 used for printing. Note that setting of the type of the ink ribbon 105 at the ribbon setting portion 101 is performed by a manual operation of an operator such as depressing of a button B. Alternatively, the type of ink ribbon 105 is detected by a detecting means S such as a micro switch, and the detection signal is input to the ribbon setting portion to automatically set the type of ribbon.

A carriage 103 carries a thermal head 1, the ink ribbon 105, and the like, and scans a recording sheet. A motor driver 106 drives a carriage motor 107 serving as a scanning motor of the carriage 103, and performs rotational control of the carriage motor 107 in accordance with a control signal from the control unit 100. A motor driver 108 drives a sheet feed motor 109 for feeding a recording sheet in accordance with a control signal from the control unit 100.

Figure 9:
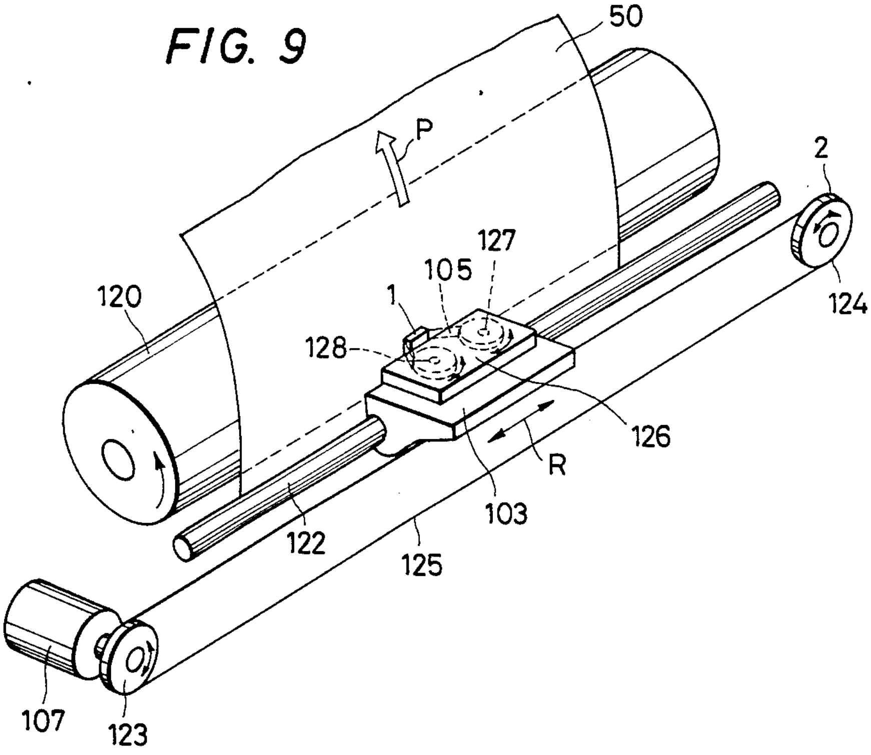
FIG. 9 is a perspective view showing a main portion of the thermal transfer printer of the embodiment shown in FIG. 8.

Description of Main Portion of Printing Section (FIG. 9)

FIG. 9 is a perspective view of the main portion of a printing section of the thermal transfer printer of this embodiment, and the same reference numerals in FIG. 9 denote the same parts as in FIG. 8.

In FIG. 9, the ink ribbon 105 is heated by the thermal head 1 in correspondence with image information, and ink of the ink ribbon 105 is transferred to a recording sheet 50 which is backed up by a platen 120, thereby achieving printing The carriage 103 is movable along a guide shaft 122 which is arranged substantially parallel to the platen 120. The carriage 103 is scanned and reciprocated in a direction of arrow R by a drive system constituted by the carriage motor (e.g., stepping motor) 107, a driving pulley 123, a driven pulley 124, and a belt 125 looped between these pulleys and coupled to the carriage 103. When the carriage 103 is scanned for one line to execute a printing operation corresponding to one line, the sheet feed motor 109 rotates the platen 120 to move the recording sheet 50 in a direction of arrow P by one line.

The thermal head 1 has a plurality of electric-heat converting elements (e.g., 40 heat generating elements 3-1 to 3-20 and 4-1 to 4-20 which are arrayed in two rows), and is mounted to be swung between a down position at which the head 1 is urged against the recording sheet 50 and an up position separated therefrom.

A ribbon cassette 126 for feeding the ink ribbon in front of the thermal head 1 is detachably set on the carriage 103. The ink ribbon 105 wound around a feed shaft 127 in the ribbon cassette 126 is fed in a predetermined direction by a ribbon drive shaft (not shown) provided to the carriage 103, and is taken up by a takeup shaft 128 in synchronism with operation of the thermal head 1.

Description of Printing & Lift-off Operations (FIGS. 10 to 14)

Figure 10:
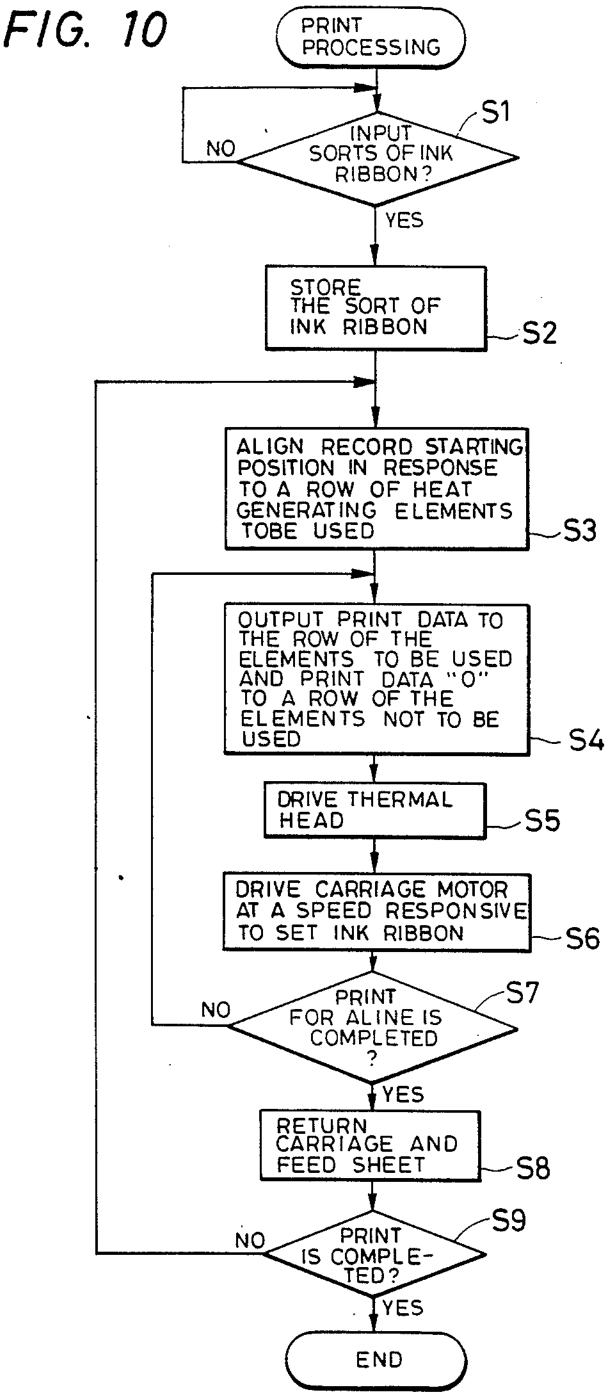
FIG. 10 is a flow chart showing print processing using a thermal head of the embodiment.

FIG. 10 is a flow chart of print processing of this embodiment. This program is stored in the ROM in the control unit 100.

When the sort of ink ribbon 105 (e.g., the ink ribbon A, B, or C described above) is input at the ribbon setting portion 101 in step S1, the flow advances to step S2. The input type of ink ribbon 105 is stored in the RAM of the control unit 100. The type of ink ribbon 105 corresponds to the type of ink ribbons shown in, e.g., FIGS. 4A to 4C.

In step S3, the row of heat generating elements to be used in the thermal head is determined in accordance with the type of ink ribbon 105. The thermal head 1 is moved in a recording direction or a direction opposite thereto by an interval between the rows 3 and 4 of heat generating elements, so that a print start position is not deviated depending on the rows of heat generating elements to be used. In step S4, print data is output to the row of heat generating elements to be used for recording, and print data "0" is output to the other row of heat generating elements, i.e., the row of heat generating elements not used for recording so as not to be heated.

In step S5, the row of heat generating elements to be used for recording of the thermal head 1 is energized for a predetermined period of time. In step S6, the carriage motor 107 is rotated by a predetermined amount at a speed corresponding to the type of the ink ribbon 105, thereby moving the carriage 103. It is checked in step S7 if printing for one line is completed. If printing for one line is completed, the flow advances to step S8, and carriage return, sheet feed operation, and the like is performed. The flow then advances to step S9, and the above operation is repeated until all the data is printed.

Figure 13A:
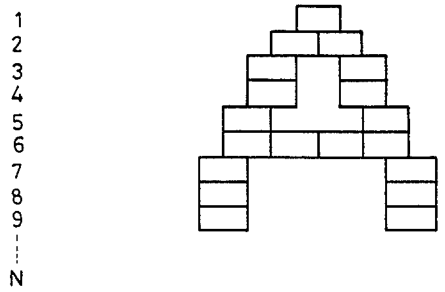
FIGS. 13A to FIG. 13C are views showing a pattern of letter "A" and dot energization charts.
Figure 13B:
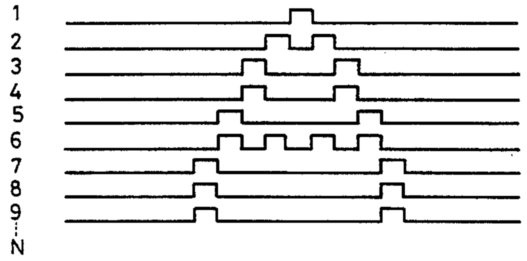

FIG. 13 is a view for explaining a recording operation. FIG. 13A shows a pattern of letter "A", and FIG. 13B shows drive signals applied to the heat generating elements for recording letter "A". Numerals on the left side of FIGS. 13A and 13B respectively correspond to the heat generating elements 3-1 to 3-N or 4-1 to 4-N.

Figure 13C:
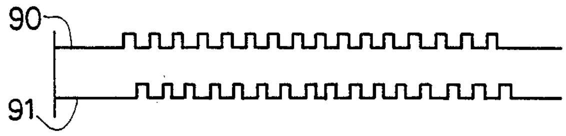

FIG. 13C is the view showing a timing when a lift-off correction of a non-penetration type ink ribbon is performed.

In FIG. 13C, a pulse train 90 is applied to odd-numbered elements of the row 4 of heat generating elements, and a pulse train 91 is applied to even-numbered elements of the row 4 of the heat generating elements. As shown in FIGS. 6A and 6B, dots on the recording sheet 50 are lefted off therefrom, and are adhered to the ink ribbon 105. Upon lift-off elimination, the same data as recording data to be eliminated can be output to row 4 of heat generating elements.

Figure 11:
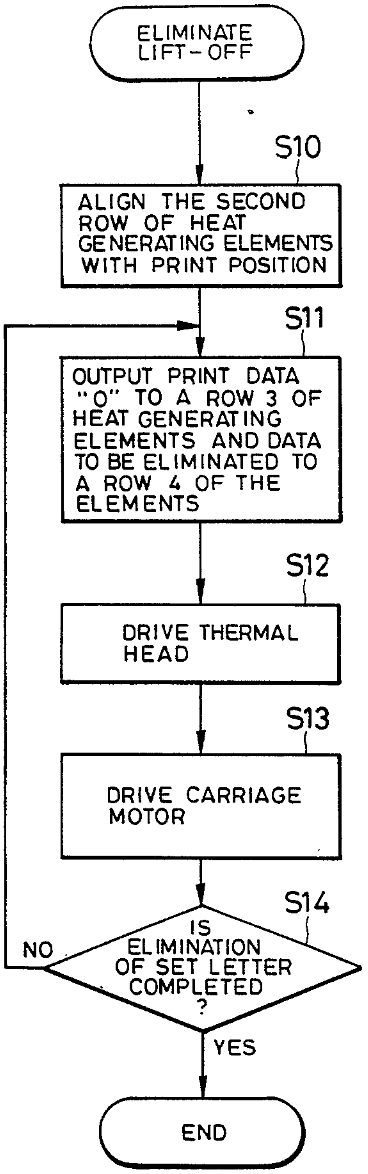
FIG. 11 is a flow chart showing lift-off elimination processing.

FIG. 11 is a flow chart showing a lift-off operation. In this case, only row 4 of heat generating elements is used.

In step S10, the carriage 103 is moved to a printing position to be eliminated. In step S11, print data "0" is output to the row 3 of heat generating elements, and data corresponding to data to be eliminated or solid black data is output to the row 4 of heat generating elements. In step S12, the thermal head 1 is driven. In this case, the odd- and even-numbered heat generating elements may be separately driven as described above. In step S13, the carriage 103 is moved by a predetermined amount at a speed corresponding to the temperature characteristics of an ink ribbon. In step S14, it is checked if the set data portion is eliminated. If NO in step S14, the flow returns to step S11, and the above operation is performed, so that the recording data such as a set letter, is eliminated by a lift-off operation.

Figure 14:
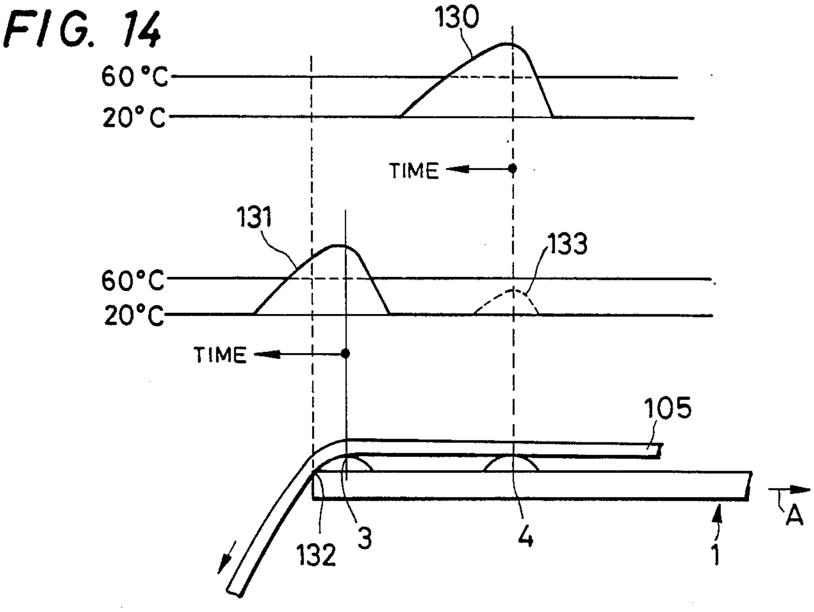
FIG. 14 is view showing a change in temperature upon driving of the thermal head.

FIG. 14 is a graph showing a change in temperature upon energization of the thermal head.

In FIG. 14, a curve 130 represents a temperature change when the ink ribbon is heated, cooled and lifted off for image recording or lift-off elimination. This curve represents a temperature change during recording by the penetration type ribbon or the first ink layer of the multilayered, multi-color ink ribbon shown in FIG. 4A or lift-off correction by the non-penetration type ink ribbon.

A curve 131 represents a temperature change when recording is performed such that after the ink ribbon is heated, it is lifted off from a recording sheet before it is cooled like in recording using the non-penetration type ink ribbon or the second ink layer of the multilayered, multi-color ink ribbon.

In the graph of FIG. 14, the ink ribbon is cooled between heating by row 4 of heat generating elements and lift-off. However, since the cooling state depends on a time, the moving speed of the carriage 103, the distance between the row 4 of heat generating elements and a thermal head end portion 132, or the moving speed of the carriage 103 can be determined to obtain the temperature change over time represented by the curve 130.

In addition, control may be made as follows. Upon completion of recording (elimination), the thermal head 1 is moved by a distance longer than a distance between the heat generating elements used for lift-off and the thermal head end portion 132, so that lift-off is performed without adhesion. Therefore, upon completion of recording (elimination), a moving amount of the thermal head 1 may be changed depending on the type of ribbon.

A curve 133 represents a change in temperature when the row 4 of heat generating elements is preliminarily heated with a shorter pulse width than usual. In this case, if the row 3 of heat generating elements is heated to a temperature lower than usual, a temperature change represented by the curve 131 can be obtained.

Figure 12:
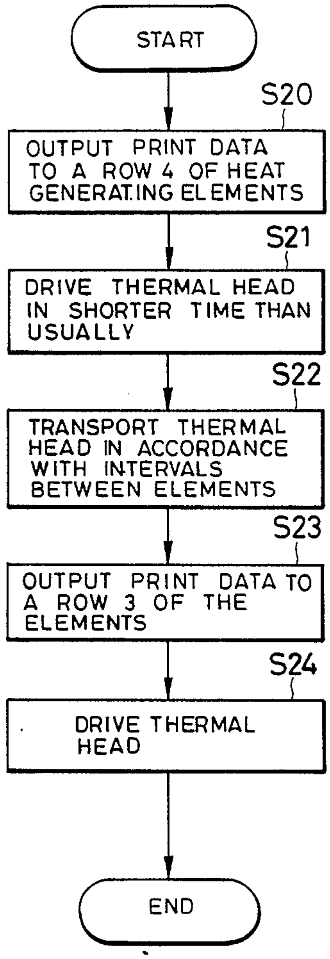
FIG. 12 is a flow chart of preliminary heating processing.

FIG. 12 is a flow chart showing a recording operation in which preliminary heating is performed.

In step S20, print data is output to row 4 of heat generating elements. In step S21, the thermal head is driven for a shorter time than that in normal recording. In step S22, the carriage 103 is moved by a distance corresponding to an interval between the rows 3 and 4 of heat generating elements. In step S23, print data is output to row 3 of heat generating elements. In step S24, the thermal head is driven for a shorter time than that in normal recording.

In this embodiment, a so-called serial printer in which a thermal head is moved along a printing line has been described. However, the present invention is not limited to this. For example, in a thermal printer used in e.g a facsimile apparatus, which performs recording per line by a thermal line head and recording paper is fed in a direction perpendicular to the thermal head, if a plurality of recording heat generating elements are provided in a line direction, recording sheets of different lift-off temperatures can be employed.

As described above according to this embodiment, recording can be performed in correspondence with various types of ink ribbons.

The rows of heat generating elements are simultaneously energized by the common electrode 5. However, a common electrode may be provided for each row of heat generating elements, so that the rows of heat generating elements may be driven at different times. A heating temperature of the rows of heat generating elements may be changed, so that preliminary heating may be performed or the thermal head of this embodiment may be applied to a still higher- or lower-temperature ink ribbon.

As described above, according to the thermal recording apparatus of this embodiment, since a thermal transfer medium or a recording medium can be preliminarily heated, power for the thermal head can be saved. According to the thermal recording apparatus of this embodiment, recording and correction operations can be performed using a variety of thermal transfer media. In addition, since a recording operation can be performed in correspondence with temperature characteristics of the thermal transfer medium, a variety of thermal transfer media can be used.

As described above, according to a thermal head to which the embodiment of the present invention is applied, and a thermal recording apparatus using the thermal head, a clear image can be recorded in accordance with the type of a recording medium or thermal transfer medium.

What is claimed is:

1. A thermal recording apparatus for transferring ink of a thermal transfer medium to a recording medium so as to record an image on the recording medium, comprising:
   - a thermal head having a plurality of parallel rows of heat generating elements at predetermined intervals;
   - scanning means for relatively scanning said thermal head and the recording medium so as to perform image recording;
   - setting means for selecting the type of thermal transfer medium to be used; and
   - drive means for selecting and driving a row of heat generating elements in correspondence with the selected thermal transfer medium.

2. An apparatus according to claim 1, wherein said drive means eliminates offset of a recording start position when the row of heat generating elements to be used for recording is changed.

3. An apparatus according to claim 1, wherein at least one of said plurality of rows of heat generating elements of said thermal head is provided at an upstream side of a board.

4. An apparatus according to claim 1, wherein selecting the type of thermal transfer medium at said setting means is performed by manual operation of an operator.

5. An apparatus according to claim 1, wherein the thermal transfer medium selected by said setting means is a penetration type ink ribbon in which an ink layer is adhered to a base film binder agent.

6. An apparatus according to claim 1, wherein the thermal transfer medium selected by said setting means is a nonpenetration type ink ribbon having a lift-off layer between a base film and an ink layer.

7. An apparatus according to claim 6, wherein the ink layer is formed of a material prepared by mixing carbon black or another dye with a medium such as ethylene-vinyl acetate, polyacrylic resin and polyvinyl alcohol resin, which provides an adhesion force upon heating.

8. An apparatus according to claim 6, wherein the lift-off layer is formed of a material such as wax material, polyethylene or polyamide of a small molecular weight, which is melted and has a low viscosity upon heating.

9. An apparatus according to claim 1, wherein the thermal transfer medium selected by said setting means is a multi-layered and multi-colored ink ribbon which comprises a base film, a first ink layer including a coloring pigment such as carbon black or another dye with high adhesion force and a second ink layer having an adhesion force lower than that of the first ink layer and including a coloring pigment such as carbon black or another dye different from the first ink layer.

10. An apparatus according to claim 1, wherein said plurality of rows of heat generating elements each have an identical number of heat generating elements.

11. A thermal recording apparatus for transfering ink of a thermal transfer medium to a recording medium to record an image on the recording medium, comprising:
   - a thermal head having a first row of heat generating elements and a second row of heat generating elements arranged substantially parallel to said first row of heat generating elements at a predetermined interval;
   - scanning means for relatively scanning said thermal head and the recording medium to perform recording;
   - setting means for selecting a type of thermal transfer medium to be used;
   - means for selecting a row of heat generating elements to be used for recording in correspondence with the thermal transfer medium selected by said setting means; and
   - changing means for changing a scanning speed of said scanning means in correspondence with the selected thermal transfer medium and the row of heat generating elements to be used.

12. An apparatus according to claim 11, wherein said changing means adjusts a time interval of heating by the selected row of heat generating elements of said thermal head to a lift-off operation by changing a scanning speed.

13. An apparatus according to claim 11, wherein either said first and second rows of heat generating elements of said thermal head is arranged at an upstream side of a board in a recording direction.

14. An apparatus according to claim 13, wherein at least one of said plurality of rows of heat generating elements has a different heating temperature.

15. An apparatus according to claim 13, further comprising a shift register for serially storing energization data of said plurality of heat generating elements on said board.

16. An apparatus according to claim 11, wherein said first and second rows of heat generating elements each have an identical number of heat generating elements.

17. An apparatus according to claim 11, wherein selecting the type of thermal transfer medium at said setting means is performed by a manual operation of an operator.

18. An apparatus according to claim 11, wherein the thermal transfer medium selected by said setting means is a penetration type ink ribbon in which an ink layer is adhered to a base film binder agent.

19. An apparatus according to claim 11, wherein the thermal transfer medium selected by said setting means is a nonpenetration type ink ribbon having a lift-off layer between a base film and an ink layer.

20. An apparatus according to claim 19, wherein the ink layer is formed of a material prepared by mixing carbon black or another dye with a medium such as ethylene-vinyl acetate, polyacrylic resin and polyvinyl alcohol resin, which provides an adhesion force upon heating.

21. An apparatus according to claim 19, wherein the lift-off layer is formed of a material such as wax material, polyethylene or polyamide of a small molecular weight, which is melted and has a low viscosity upon heating.

22. An apparatus according to claim 11, wherein the thermal transfer medium selected by said setting means is a multi-layered and multi-colored ink ribbon which comprises a base film, a first ink layer including a coloring pigment such as carbon black or another dye with high adhesion force and a second ink layer having an adhesion force lower than that of the first ink layer and including a coloring pigment such as carbon black or another dye different from the first ink layer.

23. A thermal recorded apparatus having a thermal head for transferring ink of a thermal transfer medium to a recording medium so as to record an image on the recording medium, comprising:

a board; and a plurality of rows of heat generating elements which are arranged on said board to be parallel to each other at predetermined intervals in a recording direction, with each said row having a plurality of heat generating elements, wherein said plurality of rows of heat generating elements are subjected to ON/OFF control of heating in accordance with information generated by said thermal recording apparatus to indicate the type of thermal transfer medium being used therein.

24. An apparatus according to claim 23, wherein the thermal transfer medium selected by said setting means is a penetration type ink ribbon in which an ink layer is adhered to a base film binder agent.

25. An apparatus according to claim 23, wherein the thermal transfer medium selected by said setting means is a nonpenetrating type ink ribbon having a lift-off layer between a base film and an ink layer.

26. An apparatus according to claim 25, wherein the ink layer is formed of a material prepared by mixing carbon black or another dye with a medium such as ethylene-vinyl acetate, polyacrylic resin and polyvinyl alcohol resin, which provides an adhesion force upon heating.

27. An apparatus according to claim 25, wherein the lift-off layer is formed of a material such as wax material, polyethylene or polyamide of a small molecular weight, which is melted and has a low viscosity upon heating.

28. An apparatus according to claim 23, wherein the thermal transfer medium selected by said setting means is a multi-layered and multi-colored ink ribbon which comprises a base film, a first ink layer including a coloring pigment such as carbon black or another dye with high adhesion force and a second ink layer having an adhesion force lower than that of the first ink layer and including a coloring pigment such as carbon black or another dye different from the first ink layer.

* * * * *

UNITED STATES PATENT AND TRADEMARK OFFICE

CERTIFICATE OF CORRECTION

PATENT NO. : 4,947,188

DATED : August 7, 1990

INVENTOR(S) : MINEO NOZAKI

It is certified that error appears in the above-identified patent and that said Letters Patent is hereby corrected as shown below:

AT [57] ABSTRACT

Line 6, "of" should read --at--.

COLUMN 1

Line 43, "ribbon de-" should read --ribbon has been de---.

COLUMN 4

Line 28, ",upon" should read --upon-- and "after," should read --after--.
Line 35, "adhesion" should read --an adhesion--.
Line 36, "an" should be deleted.
Line 41, "compound a" should read --compound, a--.

COLUMN 7

Line 33, "the" (second occurrence) should be deleted.
Line 36, "sort" should read --type--.
Line 57, "selecting" should read --selecting,--.
Line 60, "the," should read --the--.

COLUMN 8

Line 33, "of" (second occurrence) should be deleted.

COLUMN 9

Line 23, "sort" should read --type--.
Line 28, "type" should read --types--.
Line 68, "lefted" should read --lifted--.

UNITED STATES PATENT AND TRADEMARK OFFICE
CERTIFICATE OF CORRECTION

PATENT NO. : 4,947,188

DATED : August 7, 1990

INVENTOR(S) : MINEO NOZAKI

It is certified that error appears in the above-identified patent and that said Letters Patent is hereby corrected as shown below:

COLUMN 11

Line 7, "in e.g." should read --in, e.g.--.

COLUMN 13

Line 41, "thermal recorded apparatus" should read --thermal recording apparatus--.

COLUMN 14

Line 20, "nonpenetrating" should read --nonpenetration--.

Signed and Sealed this

Eighteenth Day of February, 1992

Attest:

HARRY F. MANBECK, JR.

*Attesting Officer*

*Commissioner of Patents and Trademarks*